United States Patent
Shimizu et al.

(10) Patent No.: US 6,908,411 B2
(45) Date of Patent: Jun. 21, 2005

(54) VEHICLE DRIVE CONTROL APPARATUS

(75) Inventors: Kouichi Shimizu, Sagamihara (JP); Hiroyuki Ohya, Zama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/641,125

(22) Filed: Aug. 15, 2003

(65) Prior Publication Data

US 2004/0040817 A1 Mar. 4, 2004

(30) Foreign Application Priority Data

Sep. 3, 2002 (JP) ........................................ 2002-257550

(51) Int. Cl.[7] .............................................. B60K 6/02
(52) U.S. Cl. ............................. 477/5; 477/8; 477/174; 180/65.2
(58) Field of Search .................... 192/30 W, 84.1; 477/5, 8, 13, 906, 166, 174; 180/65.2, 65.4, 65.6

(56) References Cited

U.S. PATENT DOCUMENTS

| | | |
|---|---|---|
| 6,434,469 B1 | 8/2002 | Shimizu et al. |
| 6,442,454 B1 | 8/2002 | Akiba et al. |
| 2001/0027907 A1 | 10/2001 | Nishida et al. |
| 2003/0010559 A1 | 1/2003 | Suzuki |
| 2003/0064858 A1 | 4/2003 | Saeki et al. |
| 2003/0089539 A1 | 5/2003 | Kadota |
| 2003/0151381 A1 | 8/2003 | Kadota et al. |
| 2003/0216215 A1 * | 11/2003 | Suzuki et al. .................. 477/5 |
| 2004/0040759 A1 * | 3/2004 | Shimizu et al. ............. 180/65.2 |
| 2004/0055304 A1 * | 3/2004 | Shimizu et al. ............... 60/698 |

FOREIGN PATENT DOCUMENTS

| | | |
|---|---|---|
| JP | 03-181622 A | 8/1991 |
| JP | 11-332009 A | 11/1999 |
| JP | 2001-138764 A | 5/2001 |
| JP | 2001-289268 A | 10/2001 |
| JP | 2001-349355 A | 12/2001 |
| JP | 2002-160541 A | 6/2002 |
| JP | 2002-218605 A | 8/2002 |
| JP | 2002-240589 A | 8/2002 |
| JP | 2003-025861 A | 1/2003 |
| JP | 2003-130200 A | 5/2003 |
| JP | 2003-156079 A | 5/2003 |
| JP | 2003-209902 A | 7/2003 |

* cited by examiner

*Primary Examiner*—Richard M. Lorence
(74) *Attorney, Agent, or Firm*—Shinjyu Global IP Counselors, LLP

(57) ABSTRACT

A vehicle drive control apparatus is provided for detecting clutch trouble early and alert the driver to the need for clutch repair. The vehicle drive control apparatus is provided in a vehicle having a clutch disposed between an electric motor and a wheel driven by the electric motor. The drive control apparatus comprises a clutch control section and a diagnosis section. The clutch control section is configured to control engagement of the clutch to selectively drive the wheel by the electric motor. The diagnosis section is configured to diagnose whether or not the clutch can be operated by controlling the clutch control section to turn on and off the clutch, when the diagnosis section determines that the wheel is not being driven by the electric motor.

17 Claims, 11 Drawing Sheets

VEHICLE DRIVE CONTROL APPARATUS

BACKGROUND OF THE INVENTION

1. Field of the Invention

The present invention relates to a vehicle drive control apparatus, particularly a vehicle drive control apparatus configured such that a wheel is driven selectively by an electric motor through a control clutch.

2. Background Information

One example a vehicle drive control apparatus is disclosed in Japanese Laid-Open Patent Publication No. 2002-218605. There are known examples of this kind of vehicle drive control apparatuses that employ four-wheel drive to improve acceleration performance and traveling stability. Such apparatuses are configured such that either the front wheels or the rear wheels are designated as the main drive wheels and either the rear wheels or the front wheels (whichever are not designated as the main drive wheels) are designated as the subordinate drive wheels. The main drive wheels are driven by an internal combustion engine and the power of the internal combustion engine is also used to drive a generator. The subordinate wheels are connected to an electric motor through an electric clutch. When it is estimated that the main drive wheels are undergoing acceleration slippage, the generator load torque of the generator is controlled to a torque corresponding to the acceleration slippage amount and the generated electric power is used to drive the electric motor, which drives the subordinate drive wheels through the clutch.

In view of the above, it will be apparent to those skilled in the art from this disclosure that there exists a need for an improved vehicle drive control apparatus. This invention addresses this need in the art as well as other needs, which will become apparent to those skilled in the art from this disclosure.

SUMMARY OF THE INVENTION

It has been discovered that in a four-wheel drive-capable vehicle like that just described goes into a two-wheel drive mode in which the clutch is disconnected such that the subordinate drive wheels are not driven and only the main drive wheels are driven when the coefficient of friction of the road surface is large and the main drive wheels do not undergo acceleration slippage.

Since the clutch is not operated at all for a long time when the two-wheel drive mode continues for a long period of time, it is possible for a broken wire, short circuit, or other trouble to occur in the electromagnetic solenoid of the clutch or the wiring harness thereof due to changes in the environment or conditions under which the vehicle is used. Thereafter, when acceleration slippage occurs in the main drive wheels and the drive control apparatus attempts to drive the subordinate drive wheels, the clutch might not operate due to said trouble and the desired acceleration performance and traveling stability might not be attainable. In short, there is a concern that the reliability of the drive control apparatus may decline.

The present invention was conceived in view of this possibility and its object is to provide a vehicle drive control apparatus that offers superior reliability by detecting clutch trouble early and urging the driver to have the clutch repaired.

In order to achieve the aforementioned object, a vehicle drive control apparatus is provided in a vehicle having a clutch disposed between an electric motor and a wheel driven by the electric motor. The drive control apparatus comprises a clutch control section and a diagnosis section. The clutch control section is configured to control engagement of the clutch to selectively drive the wheel by the electric motor. The diagnosis section is configured to diagnose whether or not the clutch can be operated by controlling the clutch control section to turn on and off the clutch, when the diagnosis section determines that the wheel is not being driven by the electric motor.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 5 is a graph that illustrates the relationship between the vehicle body speed and the shock the vehicle receives when the clutch turns ON;

DETAILED DESCRIPTION OF THE PREFERRED EMBODIMENTS

Selected embodiments of the present invention will now be explained with reference to FIGS. 1 to 13. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
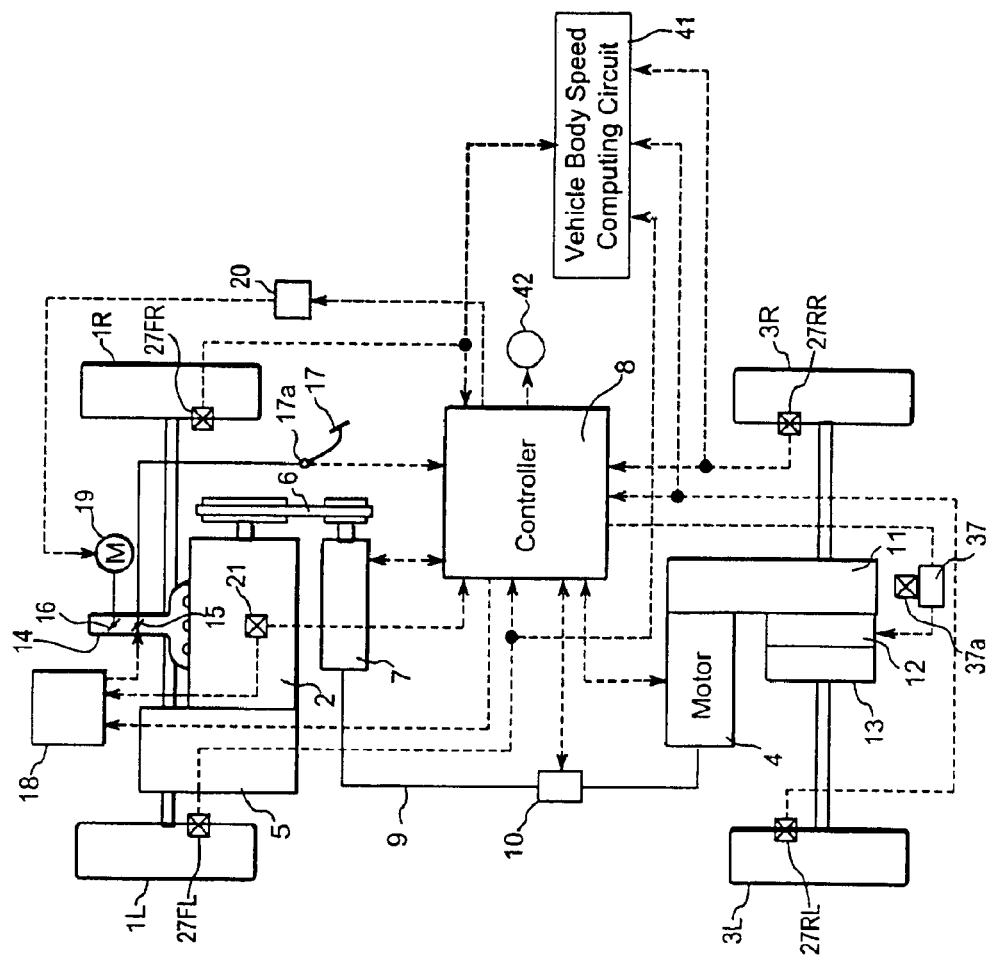
FIG. 1 is a schematic block diagram of a vehicle equipped with a vehicle drive control apparatus in accordance with a first embodiment of the present invention.
Figure 2:
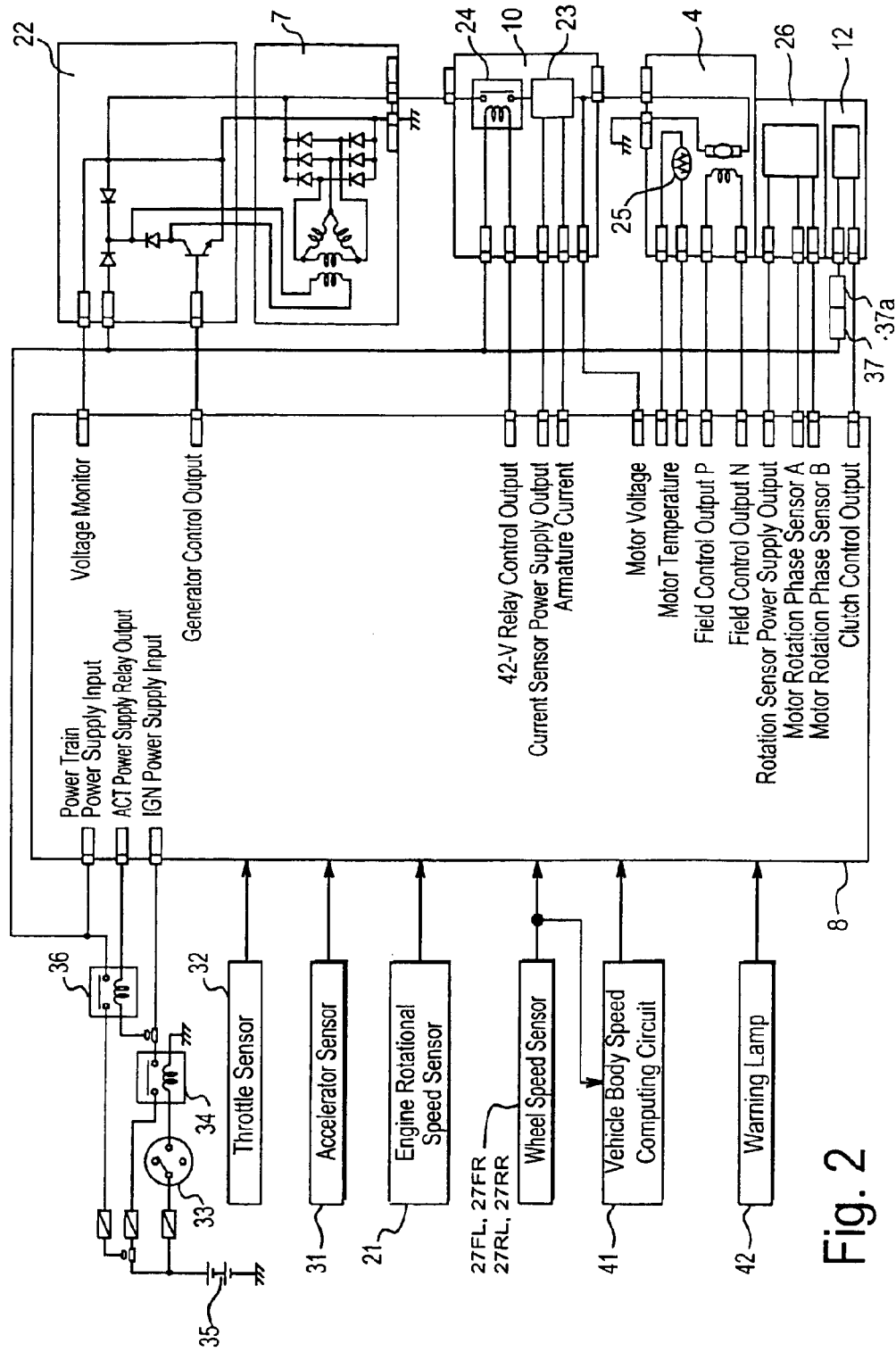
FIG. 2 is a block diagram showing a control system configuration for the vehicle drive control apparatus illustrated in FIG. 1 in accordance with the first embodiment of the present invention.
Figure 3:
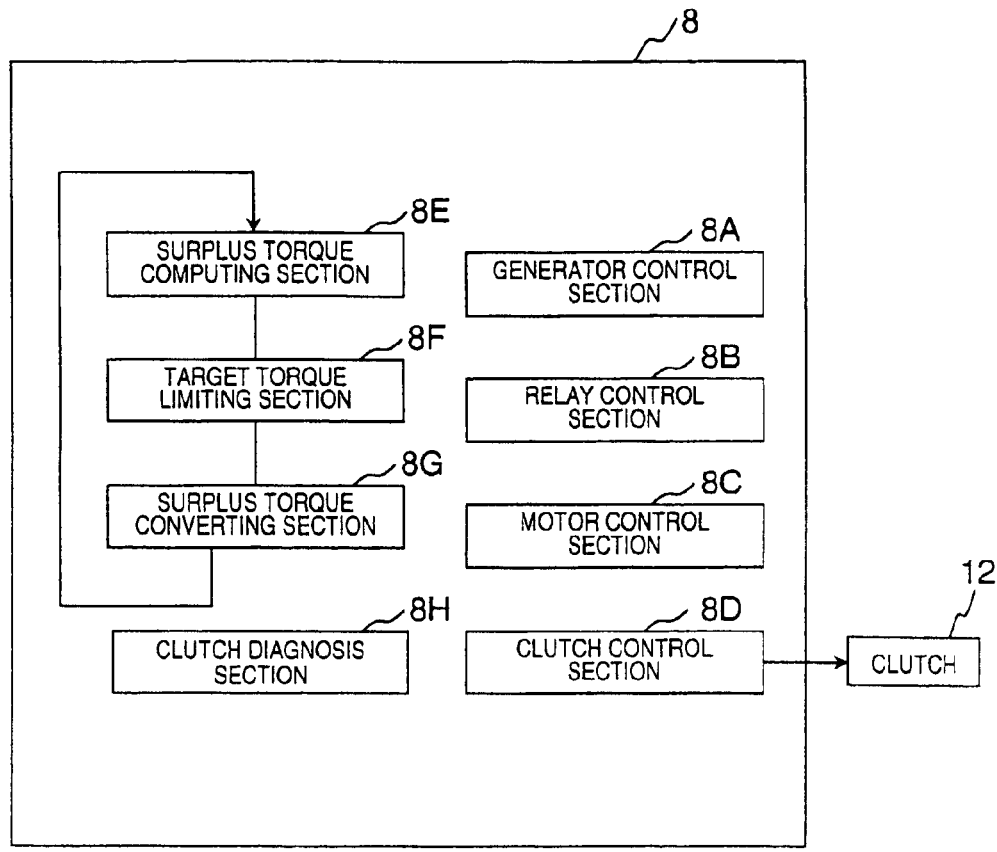
FIG. 3 is a functional block diagram showing the 4WD controller for the vehicle driving force control apparatus illustrated in FIG. 1 in accordance with the illustrated preferred embodiments of the present invention.
Figure 4:
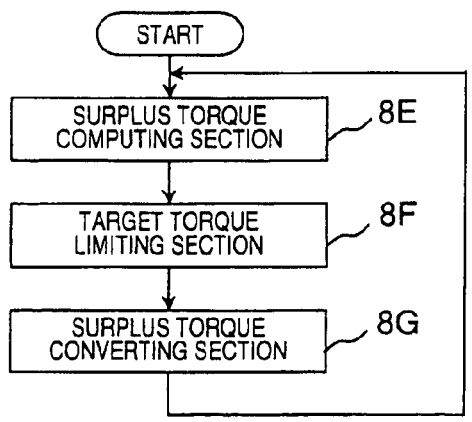
FIG. 4 is a flow chart showing the processing sequence executed by the 4WD controller for the vehicle driving force control apparatus illustrated in FIG. 1 in accordance with the illustrated embodiments of the present invention.
Figure 5:
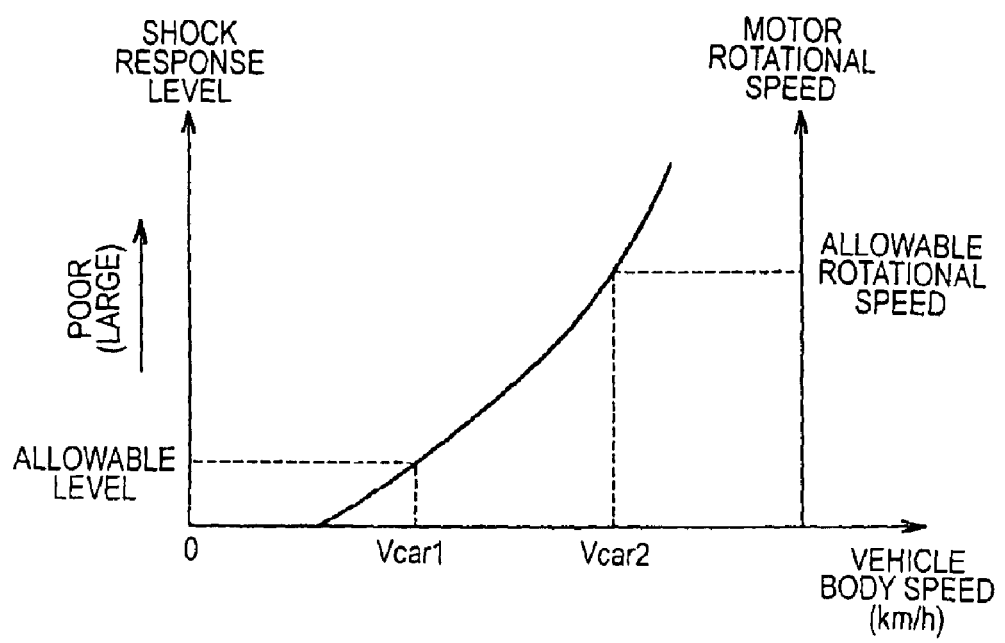
Figure 6:
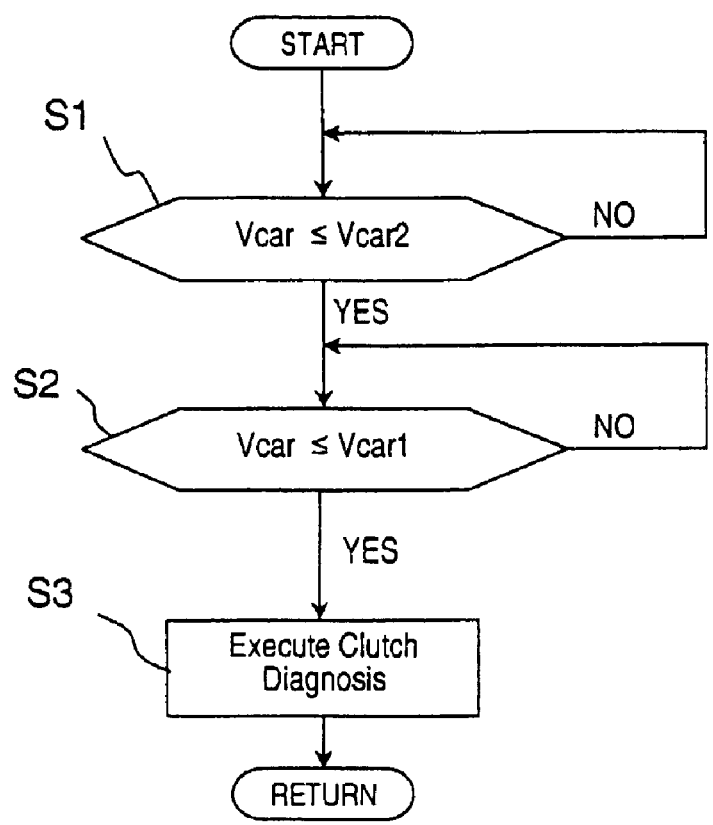
FIG. 6 is a flowchart for explaining the operation executed by the 4WD controller for the vehicle drive control apparatus illustrated in FIG. 1 in accordance with the first embodiments of the present invention.
Figure 8:
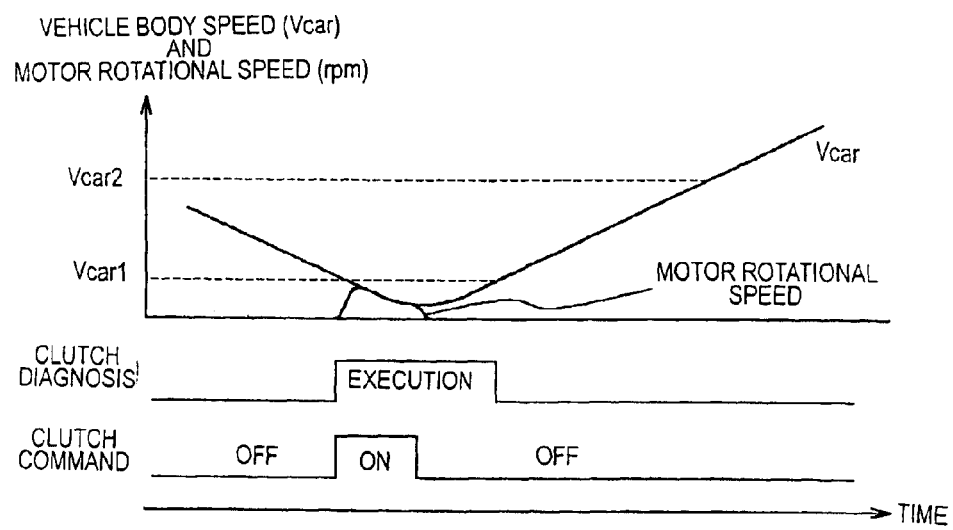
FIG. 8 is an example time chart for explaining the operation of the vehicle drive control apparatus illustrated in FIG. 1 in accordance with the first embodiment of the present invention.

Referring initially to FIGS. 1 to 5 a vehicle drive control apparatus is illustrated in accordance with a first embodiment of the present invention. FIG. 1 is a schematic view of the main components of the vehicle drive control apparatus. FIG. 2 is control system configuration for the vehicle drive control apparatus. FIG. 5 illustrates the relationship between the vehicle body speed when the clutch turns ON and the shock the vehicle receives. FIG. 6 is a flowchart for explaining the operation of the first embodiment. FIG. 8 is an example time chart for explaining the operation of the embodiment.

As seen in FIG. 1, a four wheel drive vehicle is diagrammatically illustrated that is equipped with the vehicle drive control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels.

A portion of the engine output torque of the internal combustion engine 2 is transmitted to the left and right front wheels 1L and 1R through an automatic transmission 5, equipped with a torque convertor, and a differential gear (not shown) in a conventional manner. An endless drive belt 6 transfers power from the internal combustion engine 2 to a generator 7, which supplies electrical energy to the electric motor 4. Thus, a portion of the engine output torque of the internal combustion engine 2 is transmitted to the generator 7 through the endless belt drive 6 to supply electrical energy to the electric motor 4. The generator 7 rotates at a rotational speed that is equal to the product of the rotational speed of the internal combustion engine 2 and the pulley ratio of the endless drive belt 6.

As seen in FIG. 2, a 4WD controller 8 is illustrated that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

The 4WD controller 8 serving as the drive control section adjusts the field current of the generator 7 and thereby adjusts the load that the generator 7 imposes on the engine 2. The generated voltage of the generator 7 is in accordance with the imposed load torque. Thus, the load placed on the internal combustion engine 2 by the generator 7 due to the field current of the generator 7 is adjusted by the 4WD controller 8 to generate a voltage corresponding to the load torque. The generator 7 then generates an electromotive force in proportion to this load torque.

The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner. Each of the left and right output sides of the differential gear 13 are linked to the left and right rear wheels 3L and 3R through the left and right drive shafts, respectively.

The clutch 12 is preferably an electromagnetic clutch that connects and disconnects in response to a clutch control command issued from the 4WD controller 8. Of course, a hydraulic clutch that is electrically controlled can be used for the clutch 12 in certain situations to carry out the present invention. Thus, the clutch 12 transmits torque from the electric motor 4 to the rear wheels 3L and 3R at a torque transfer rate corresponding to the clutch control command from the 4WD controller 8. When the clutch 12 is engaged, the vehicle is in a four-wheel (multi-wheel) drive state in which all of the wheels 1L, 1R, 3L and 3R are driven. When the clutch 12 is released, the vehicle is in a two-wheel (non-all wheel) drive state in which only the front wheels 1L and 1R are driven by the internal combustion engine 2.

A main throttle valve 15 and a sub throttle valve 16 are disposed inside an intake passage 14 (e.g., an intake manifold) of the engine 2. The throttle opening of the main throttle valve 15 is adjusted/controlled electronically by the 4WD controller 8 and an engine controller 18 based on the output of an accelerator sensor 17a that detects the depression amount of the accelerator pedal 17. Thus, the throttle opening of the main throttle valve 15 is adjusted and controlled in accordance with the amount of depression of the accelerator pedal 17, which also constitutes or functions as an accelerator position detecting device or sensor, or a throttle opening instructing device or sensor. The depression amount detection value from the accelerator sensor 17a is outputted as a control signal to the 4WD controller 8. The accelerator sensor 17a constitutes an acceleration or throttle instruction sensor. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening degree in response to drive signals from a motor controller 20. Specifically, the throttle opening degree of the sub throttle valve 16 is adjusted and controlled by the rotational angle of the stepper motor 19, which corresponds to the step count. The rotational angle of the stepper motor 19 is adjusted and controlled by a drive signal from the motor controller 20. The sub throttle valve 16 is provided with a throttle sensor. The step count of the stepper motor 19 is feedback-controlled based on the throttle opening detection value detected by this throttle sensor. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed of the internal combustion engine 2. The engine rotational speed sensor 21 outputs a control signal that is indicative of the engine rotational speed to both the engine controller 18 and the 4WD controller 8.

The generator 7 is equipped with a voltage adjuster 22 for adjusting the output voltage thereof. The voltage adjuster 22 is configured such that the generator load torque it imposes on the engine 2 and the voltage it generates are controlled by the 4WD controller 8, which accomplishes said control by adjusting the field current of the generator 7. The voltage adjuster 22 receives a generator control command (field current value) from the 4WD controller 8 and adjusts the field current of the generator 7. The voltage adjuster 22 is also capable of detecting the output voltage of the generator 7 and outputting the detected voltage value to the 4WD controller 8. Additionally, the rotational speed of the generator 7 can be computed based on the rotational speed Ne of the engine 2 and the pulley ratio of the endless drive belt 6.

A current sensor 23 and a relay 24 are connected in series inside the junction box 10. The current sensor 23 detects the current value of the electric power delivered to the electric motor 4 from the generator 7. The relay 24 connects and disconnects the supply of generated electric power from the generator 7 to the electric motor 4 in accordance with a command from the 4WD controller 8. The current sensor 23 detects the armature current supplied to the electric motor 4 from the generator 7 and outputs the detected armature current to the 4WD controller 8. The voltage value flowing through the electrical line 9 is detected by the 4WD controller 8 to produce a control signal indicative of the voltage across the electric motor 4.

The motor 4 is also configured such that its field current, and thus its drive torque, is controlled by a command from the 4WD controller 8. A thermistor 25 measures the temperature of the motor 4 and outputs the detected temperature to the 4WD controller 8.

The motor 4 is also provided with a motor rotational speed sensor 26 configured to detect the rotational speed of the drive shaft of the motor 4 and the motor rotational speed signal detected by the motor rotational speed sensor 26 is sent to the 4WD controller 8.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12. Moreover, each speed sensor 27FL, 27FR, 27RL, and 27RR also constitutes or functions as a driving force detection section that is configured to detect a vehicle traveling speed of the vehicle.

The 4WD controller 8 is connected to a battery 35 through a relay switch 34 that is energized when the ignition switch 33 is turned on. Also, the field coil of the generator 7 and the relay coil of the relay 24 are connected to the battery 35 through a relay switch 36, which is energized when the relay switch 34 is ON. An electromagnetic solenoid 37 of the clutch 12 is also connected to the battery 35 through the relay switch 36, which is energized when the relay switch 34 is ON.

A warning lamp 42 is also connected to the 4WD controller 8. The warning lamp 42 is configured to illuminate or flash when the diagnosis finds that the clutch 12 has trouble as explained below. The warning lamp 42 functions as a warning section.

As shown in FIG. 3, the 4WD controller 8 includes a generator control section 8A, a relay control section 8B, a motor control section 8C, a clutch control section 8D, a surplus torque computing section 8E, a target torque limiting section 8F, a surplus torque converting section 8O and a clutch diagnosis section 8H.

As shown in FIG. 4, at a prescribed sampling time cycle, the 4WD controller 8 executes the processing of the surplus torque computing section 8E, the target torque limiting section 8F, and the surplus torque converting section 8G in sequence based on the input signals. Together, the surplus torque computing section 8E, the target torque limiting section 8F, and the surplus torque converting section 8G constitute an output torque control section of the 4WD controller 8.

The 4WD controller 8 basically operates in the same manner as that described in Japanese Laid-Open Patent Publication No. 2002-218605 or U.S. Pat. No. 6,434,469. More specifically, based on the wheel speed detection values from the wheel speed sensors 27FL, 27FR, 27RL, and 27RR or based on the drive torque transmitted to the left and right front wheels 1L and 1R (main drive wheels) from the internal combustion engine 2 and the road surface reaction force limit torque of the left and right front wheels 1L and 1R, the 4WD controller 8 estimates if the left and right front wheels 1L and 1R are experiencing acceleration slippage. If acceleration slippage is estimated to be occurring, the 4WD controller 8 controls the field current of the generator 7 such that the generator load torque is adjusted to a torque value corresponding to the amount of acceleration slippage. At the same time, the 4WD controller 8 turns on the relay 24 and the clutch 12 and supplies the electric motor 4 with electric power from the generator 7 through the relay 24. As a result, the electric motor 4 drives the left and right rear wheels 3L and 3R (subordinate drive wheels) through the clutch 12.

Thus, when the torque transferred from the engine 2 to the front wheels 1L and 1R is larger than the road surface reaction force limit torque, i.e., when acceleration slippage occurs in the left and right front wheels 1L and 1R (which are the main drive wheels), due to the road surface friction coefficient $\mu$ being small or the driver depressing the accelerator pedal 17 too deeply, the generator 7 is generated at a generator load torque corresponding to the amount of acceleration slippage. As a result, the drive torque transferred to the left and right front wheels 1L and 1R is adjusted so as to approach the road surface reaction force limit torque of the front wheels 1L and 1R and acceleration slippage of the left and right front wheels 1L and 1R (which are the main drive wheels) is suppressed.

Furthermore, the acceleration performance and traveling stability of the vehicle are improved because the surplus electric power generated by generator 7 is used to drive the electric motor 4, which drives the left and right rear wheels 3L and 3R (which are the subordinate drive wheels). Additionally, the energy efficiency and fuel consumption can also be improved. Descriptions of other operational details and effects of the drive control apparatus are omitted here because they are described in detail in Japanese Laid-Open Patent Publication No. 2002-218605.

In the first embodiment of the present invention, the 4WD controller 8 executes ON-OFF control of the clutch 12 for a short period of time and diagnoses whether or not the clutch 12 can be operated when the following conditions are satisfied: the relay 24 is OFF; the left and right rear wheels 3L and 3R are not being driven by the electric motor 4; the clutch 12 is in the OFF state (e.g., when the left and right front wheels 1L and 1R (main drive wheels) are estimated not to be undergoing acceleration slippage); and the vehicle body speed is equal to or less than a prescribed speed at or below which the electric motor 4 will not enter an overspeed condition.

In other words, the vehicle drive control apparatus checks the operation of the clutch 12 when the rear wheels 3L and 3R are not driven by the electric motor 4 and the vehicle body speed is equal to or less than a prescribed speed at or below which the electric motor 4 will not enter an overspeed condition. Consequently, the electric motor 4 will not rotate excessively if the clutch 12 is normal and the clutch turns ON. Meanwhile, if the clutch 12 trouble exists, the driver can be alerted to the need for repair. This arrangement allows clutch trouble to be detected without damaging the motor 4 due to overspeed or causing abnormal rotational noise to occur and enables the reliability of the vehicle drive control apparatus to be improved.

Preferably, the operation of the clutch 12 is checked when the vehicle body speed is equal to or less than a speed at which the shock the vehicle would receive should the clutch 12 be turned ON is allowable. This arrangement prevents passengers riding in the vehicle from experiencing a feeling that something is wrong with the vehicle.

As mentioned above, the clutch 12 is preferably an electromagnetic clutch that connects and disconnects in response to a clutch control command issued from the 4WD controller 8. Thus, the clutch 12 transmits torque from the electric motor 4 to the rear wheels 3L and 3R at a torque transfer rate corresponding to the clutch control command from the 4WD controller 8. The clutch 12 is connected and disconnected by selectively supplying electricity to the electromagnetic solenoid 37 of the clutch 12. A current sensor 37a is configured and arranged to detect if current is being supplied to connect the clutch 12. The current sensor 37a sends a signal indicative of current flowing through the current path of the electromagnetic solenoid 37 and/or a signal indicative of the current value of the current flows through the current path of the electromagnetic solenoid 37.

This embodiment is provided with a vehicle body speed computing circuit 41 (vehicle body speed detecting section) that computes the vehicle body speed based on the wheel speed values detected by the wheel speed sensors 27FL, 27FR, 27RL, 27RR. The computed vehicle body speed is then sent to the 4WD controller 8. It is acceptable for the function of the vehicle speed computing circuit 41 to be built into the 4WD controller 8 such that the computation is conducted by the 4WD controller 8. Instead of using the wheel speed values detected by the wheel speed sensors 27FL, 27FR, 27RL, 27RR, it is also acceptable to provide an independent vehicle body speed sensor that detects the vehicle body speed directly and feed the detected vehicle body speed to the 4WD controller 8.

The prescribed vehicle body speed at or below which the diagnosis of clutch 12 is conducted is set while taking the following points into consideration. First, the shock that the vehicle will receive if the clutch 12 is turned ON while the motor 4 is in a stopped state is shown in FIG. 5, which plots the shock response level (vertical axis) versus the vehicle body speed Vcar. As shown in FIG. 5, the shock increases with increasing vehicle body speed Vcar. Secondly, if the electric motor 4 is put into an overspeed state, it will be damaged or emit an abnormal rotational noise.

Therefore, in view of these points, the vehicle body speed Vcar at or below which the diagnosis is performed is set to a preset vehicle body speed value Vcar2 (e.g., 50 km/h) that is below the vehicle body speed corresponding to the allowable rotational speed of the electric motor 4 (e.g., 1000 rpm) or, more preferably, to a preset vehicle body speed value Vcar1 (e.g., 2 km/h) at or below which the shock imparted to the vehicle is allowable. By setting the prescribed speed in this manner, the clutch 12 can be diagnosed without causing passengers to experience a feeling that something is wrong.

Figure 7:
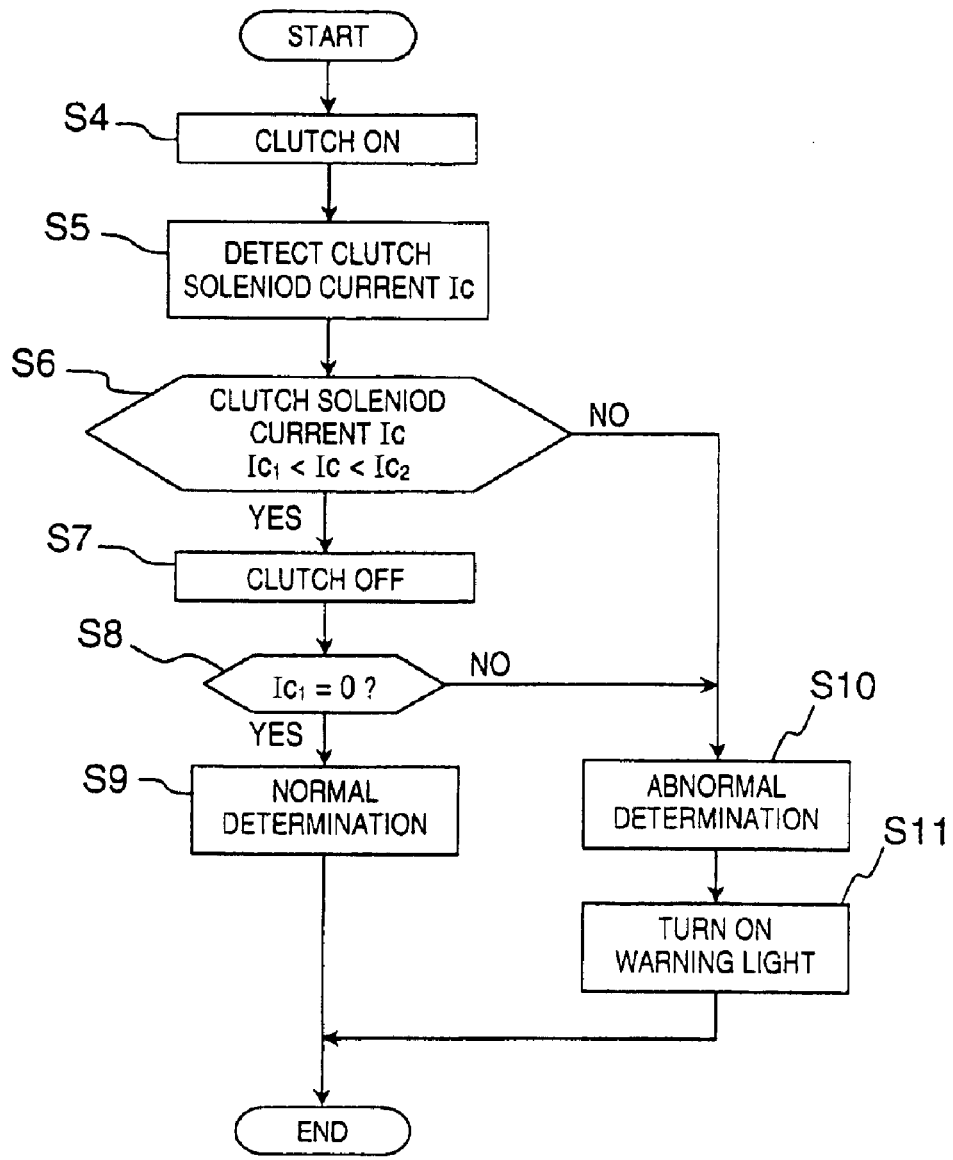
FIG. 7 is a flowchart for explaining the processing sequence executed by the clutch diagnosis section of the 4WD controller for the vehicle drive control apparatus illustrated in FIG. 1 in accordance with the first embodiments of the present invention.

Referring now to FIGS. 6 and 7, the diagnosis of the clutch 12 will now be explained. After the 4WD controller 8 determines that the conditions have been met to conduct the diagnosis of the clutch 12 in the flow chart of FIG. 6, the clutch diagnosis section 8H executes the program illustrated by the flow chart of FIG. 7. Thus, the diagnosis of the clutch 12 is conducted by the clutch diagnosis section 8H, for example, as follows.

First, the 4WD controller 8 monitors the vehicle body speed Vcar, for example, every 10 msec and determines if the vehicle body speed Vcar is less-than or equal to the preset vehicle body speed value Vcar2 (step S1). If the vehicle body speed Vcar is less than or equal to the preset vehicle body speed value Vcar2, the controller determines if the vehicle body speed Vcar is less than or equal to the preset vehicle body speed value Vcar1 (step S2). If vehicle body speed Vest Is less than or equal to the preset vehicle body speed value Vcar1 , the controller 8 executes the diagnosis of the clutch 12 (step S3).

In step S4, the 4WD controller 8 issues an ON command to the clutch 12, which operates the electromagnetic solenoid 37 to connect the clutch 12. Then, the 4WD controller 8 detects in step S5 if current flows through the current path of the electromagnetic solenoid 37 and/or detects the current value Ic of the current flows through the current path of the electromagnetic solenoid 37.

Next, in step S6, the 4WD controller 8 determines whether or not the clutch 12 is operating normally based on the current value Ic detected by the current sensor 37a when the ON command is issued. If the 4WD controller 8 determines the current value Ic is detected within a tolerance range, then the 4WD controller 8 determines that the clutch 12 is operating normally, when the ON command is issued, and the process proceeds to step S7. If the current value Ic is detected to be outside of a tolerance range or no current is detected, then the 4WD controller 8 determines that the clutch 12 is operating abnormally and the process proceeds to step S10.

In step S7, the 4WD controller 8 issues the OFF command to the clutch 12, which stops the flow of current to the electromagnetic solenoid 37 to disconnect the clutch 12. Thus, the current goes to zero when the OFF command is issued and the process proceeds to step S8.

In step S8, the 4WD controller 8 determines whether or not the clutch 12 is operating normally based on the current value Ic detected by the current sensor 37a when the OFF command is issued. If the 4WD controller 8 determines the current value Ic is zero, then the 4WD controller 8 determines that the clutch 12 is operating normally, when the OFF command is issued, and the process proceeds to step S9 and then ends. If current is still detected, then the 4WD controller 8 determines that the clutch 12 is operating abnormally and the process proceeds to step S10.

Meanwhile, in step S10, the clutch 12 is determined to be abnormal (have trouble) if no current or a current value outside the tolerance range is detected when the ON command is issued and/or if the current does not go to zero when the OFF command is issued.

In step S11, the warning lamp 42 is illuminated or flashes when the diagnosis finds that the clutch 12 has trouble. FIG. 8 shows an example of a time chart for the situation just described. As is clear from FIG. 8, the clutch diagnosis is executed and the ON and OFF commands are issued to the clutch 12 when the vehicle body speed Vcar decreases to where it is less than or equal to Vcar1 (Vcar≦Vcar1). The current in the current path of the electromagnetic solenoid 37 of the clutch 12 is detected by the current sensor 37a and the clutch 12 is determined to be normal if a current within a tolerance range is detected when the ON command is issued and the current goes to zero when the OFF command is issued. Meanwhile, the clutch 12 is determined to be abnormal (have trouble) and the warning lamp 42 is illuminated or flashed if no current or a current outside the tolerance range is detected when the ON command is issued and/or if the current does not go to zero when the OFF command is issued.

Thus, since this embodiment turns the clutch 12 ON and OFF and executes the operation check when the left and right rear wheels 3L and 3R (subordinate drive wheels) are not being driven by the electric motor 4 and the vehicle body speed is at or below a prescribed speed at or below which the motor 4 will not enter an overspeed condition (e.g., a speed Vcar1 at or below which the shock the vehicle will receive is allowable), the clutch 12 can be diagnosed without damaging the electric motor 4 or causing it to emit an abnormal rotational noise and without causing a passenger to experience a feeling that something is wrong due to vehicle shock. Also, since the warning lamp 42 operates when the clutch is found to be abnormal, the driver can be urged to repair the clutch 12 and the reliability of the apparatus can be improved.

Second Embodiment

Figure 9:
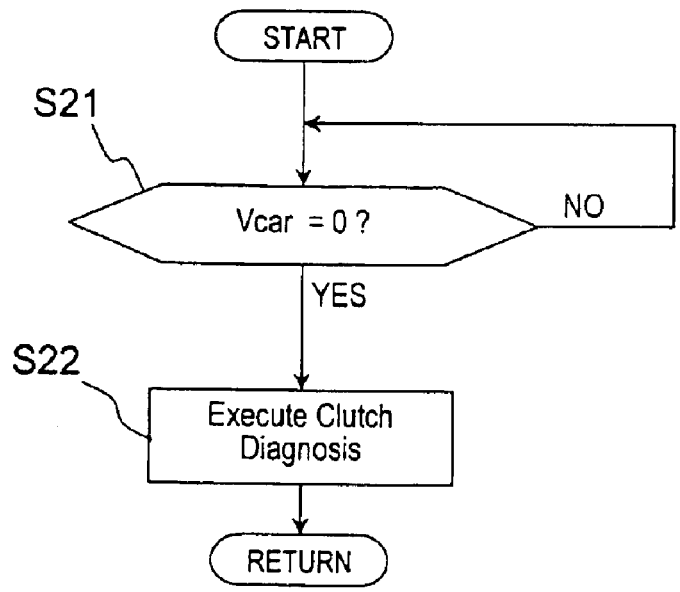
FIG. 9 is a flowchart for explaining the operation the vehicle drive control apparatus illustrated in FIG. 1 in accordance with a second embodiment of the present invention.
Figure 10:
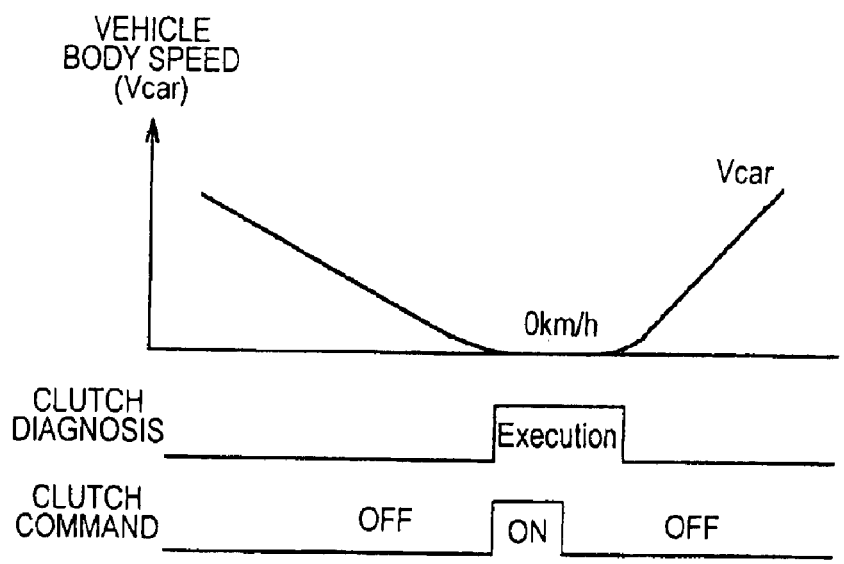
FIG. 10 is an example time chart for explaining the operation of the second embodiment of the present invention.

Referring now to FIGS. 9 and 10, a vehicle drive control apparatus in accordance with a second embodiment will now be explained. FIG. 9 is a flowchart for explaining the operation of the second embodiment and FIG. 10 is an example time chart for explaining the operation of the second embodiment. This second embodiment is the same as the first embodiment, except that the vehicle body speed Vcar at which the clutch diagnosis is executed is defined to be a speed (e.g., 0 km/h) corresponding to a state in which the vehicle is stopped.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle drive control apparatus of this second embodiment of the present invention is installed in the four wheel drive vehicle that is diagrammatically illustrated in FIG. 1. The 4WD controller 8 is configured and arranged in this embodiment of the present invention as illustrated in FIG. 2.

As shown in FIG. 9, the 4WD controller 8 monitors the vehicle body speed Vcar and determines if Vcar is equal to zero (Vcar=0) (step S21). If Vcar is equal to zero, the controller 8 executes a diagnosis of the clutch 12 (step S22).

Thus, the operation of the clutch 12 is checked when the vehicle is in a stopped state. Consequently, if the clutch 12 is normal and turns ON, the electric motor 4 will not be forced to rotate with the clutch 12 and the vehicle will not experience shock. Meanwhile, if clutch trouble exists, the driver can be alerted to the need for repair. This arrangement allows clutch trouble to be detected without causing wear of the brushes and other consumable parts of the electric motor 4 or of the clutch 12 itself and enables the reliability of the vehicle drive control apparatus to be improved.

FIG. 10 shows an example of a time chart for the situation just described. As is clear from FIG. 10, the clutch diagnosis is executed and the ON and OFF commands are issued to the clutch 12 when the vehicle body speed Vcar decreases to where it is equal to zero (Vcar=0). Similarly to the first embodiment, the current in the current path of the electromagnetic solenoid 37 of the clutch 12 is detected by the current sensor 37a and, if the clutch 12 is determined to be abnormal (have trouble), the warning lamp 42 is illuminated or flashed.

Thus, since this embodiment checks the operation of the clutch 12 when the vehicle is in a stopped condition, the electric motor 4 is not forced to rotate and the vehicle does not receive a shock in cases where the clutch 12 turns ON normally during the diagnosis. Therefore, in addition to the effects of the first embodiment, wear of the brushes and other consumable parts of the electric motor 4, as well as wear of the clutch itself, can be prevented and the reliability of the apparatus can be improved.

Third Embodiment

Figure 11:
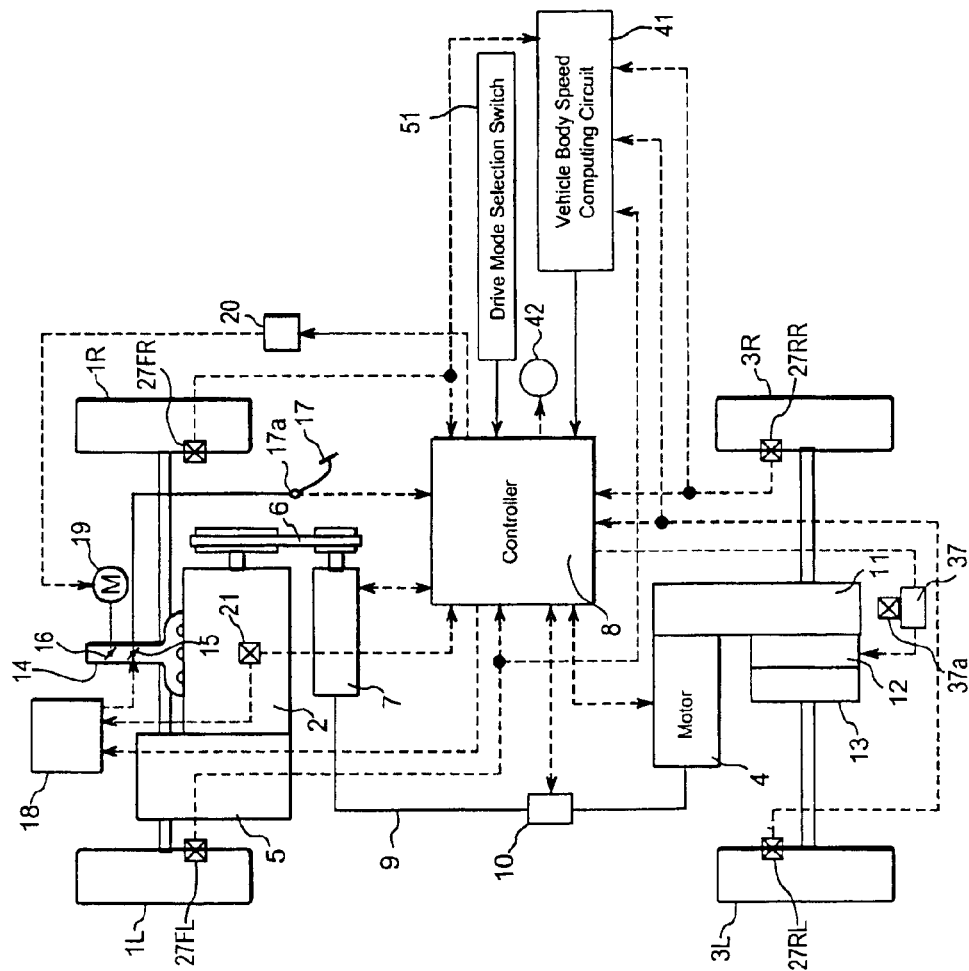
FIG. 11 is a schematic view of the main components of a vehicle drive control apparatus in accordance with a third embodiment of the present invention.
Figure 12:
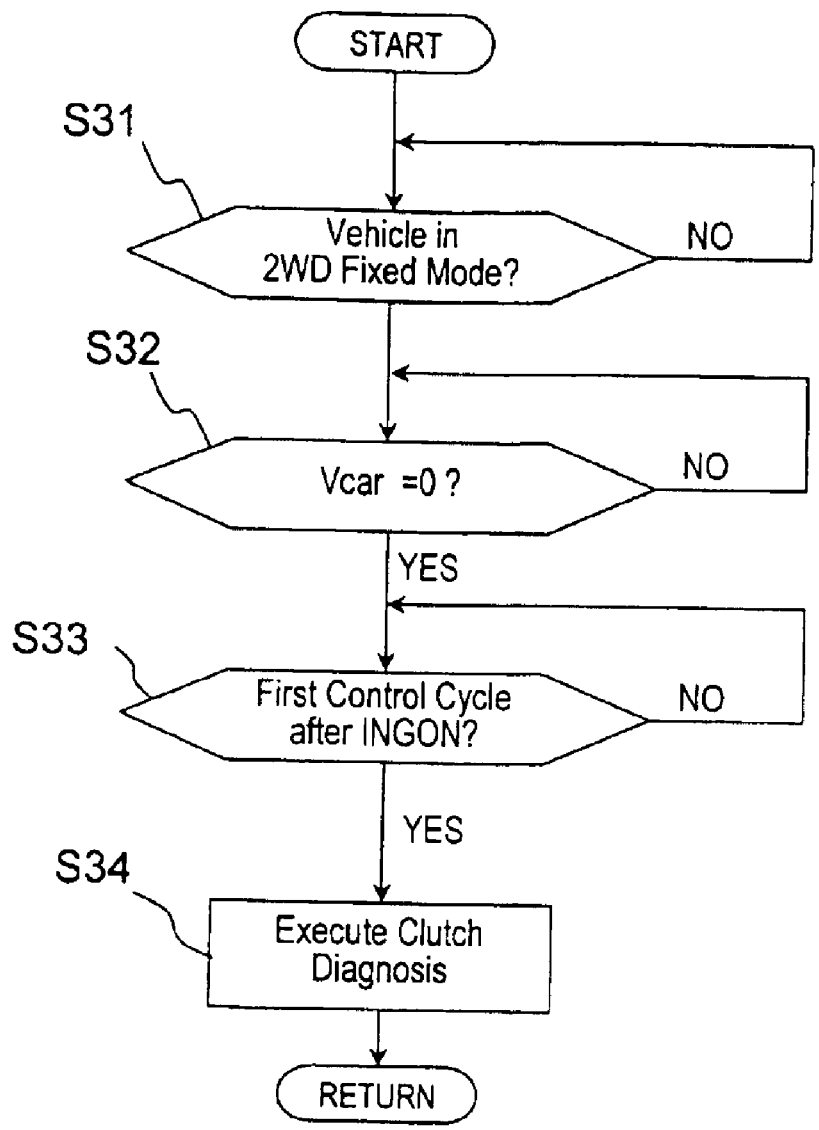
FIG. 12 is a flowchart for explaining the operation of the third embodiment.
Figure 13:
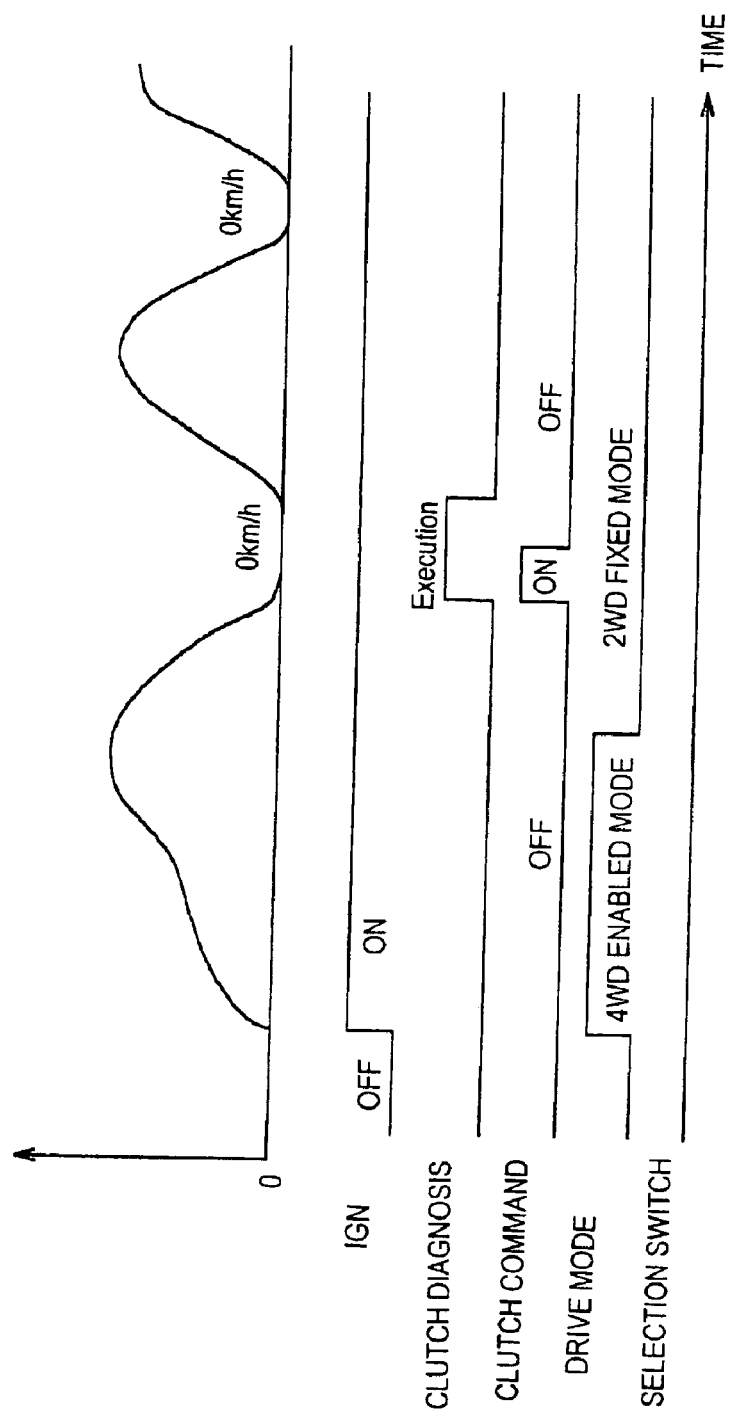
FIG. 13 is an example time chart for explaining the operation of the embodiment of the present invention.

Referring now to FIGS. 11 to 13, a vehicle drive control apparatus in accordance with a third embodiment will now be explained. FIG. 11 is a schematic view of the main components of a vehicle equipped with the vehicle drive control apparatus. FIG. 12 is a flowchart for explaining the operation of the embodiment. FIG. 13 is an example time chart for explaining the operation of the embodiment.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The 4WD controller 8 is configured and arranged in this embodiment of the present invention as illustrated in FIG. 2.

As shown in FIG. 11, this embodiment adds a drive mode selection switch 51 (drive mode selecting section) to the configuration shown in FIG. 1. The drive mode selection switch 51 is connected to the 4WD controller 8 and enables the selection of either a four-wheel drive enabled mode (4WD enabled mode) in which the left and right rear wheels 3L and 3R (which are assumed to be the subordinate drive wheels as in the previous embodiments) are selectively driven by the electric motor 4 through the clutch 12 or a two-wheel drive fixed mode (2WD fixed mode) in which the relay 24 (see FIG. 2) inside the junction box 10 and the clutch 12 are both turned OFF and only the left and right front wheels 1L and 1R (main drive wheels) are driven by the internal combustion engine 2 while the left and right rear wheels 3L and 3R are not driven.

When the drive mode selection switch 51 is set to the two-wheel drive fixed mode, the 4WD controller 8 executes the clutch diagnosis when the vehicle body speed first becomes equal to or less than the prescribed speed after the ignition switch (IGN) 33 (see FIG. 2) is turned ON. Except for the features just described, this embodiment is the same as the first embodiment.

Thus, as shown in FIG. 12, the 4WD controller 8 detects if the drive mode selection switch 51 is set to the two-wheel drive fixed mode (step S31). If the two-wheel drive fixed mode has been selected, the 4WD controller 8 monitors the vehicle body speed Vcar and determines if Vcar is less than or equal to a prescribed speed established in advance or, in this case, if Vcar is equal to zero (Vcar=0) as in the second embodiment (step S32). If Vcar equals zero (Vcar=0), the 4WD controller 8 determines if the determination that Vcar equals zero was made in the first control cycle after the ignition switch 33 was turned ON (step S33). If the current control cycle is the first control cycle, the control executes diagnosis of the clutch 12 (step S34).

Thus, since the operation of the clutch 12 is checked when the vehicle is in the two-wheel drive fixed mode, clutch trouble can be detected before the four-wheel drive enabled mode is selected. For example, in a case where the two-wheel drive fixed mode is used in the summer and the four-wheel drive enabled mode is used in the winter, clutch trouble can be detected and repaired in advance instead of being discovered for the first time in the winter when the driver attempts to use the four-wheel drive enabled mode.

Moreover, the operation of the clutch 12 is checked once each time the ignition switch is turned ON. This arrangement allows clutch trouble to be detected without causing wear of the brushes and other consumable parts of the electric motor 4. Since the clutch 12 does not fail frequently, the driver can be alerted to the need for repair sufficiently early by checking for trouble once each time the vehicle is used. Thus, since the electric motor 4 is not forced to rotate when the clutch turns ON, clutch trouble can be detected while causing less wear of the brushes and other consumable parts of the electric motor and of the clutch 12 itself than is caused in an arrangement in which the clutch operation is checked every time the vehicle starts into motion.

FIG. 13 shows an example of a time chart for the situation just described. As is clear from FIG. 13, the clutch diagnosis is executed and the ON and OFF commands are issued to the clutch 12 when the vehicle body speed Vcar first becomes equal to zero (Vcar=0) after the driver turns the ignition switch 33 ON and sets the drive mode selection switch 51 to the two-wheel drive fixed mode while driving in the four-wheel drive enabled mode. Then, similarly to the previous embodiments, the current in the current path of the electro-magnetic solenoid 37 of the clutch 12 is detected by the current sensor 37a. If the clutch 12 is determined to be abnormal (have trouble), the warning lamp 42 is illuminated or flashed. Thereafter, the clutch diagnosis is not executed when Vcar goes to zero while the vehicle is in the two-wheel drive fixed mode.

Thus, this embodiment is configured such that either a four-wheel drive enabled mode or a two-wheel drive fixed mode can be selected by using the drive mode selection switch 51 and the operation of the clutch 12 is checked when the two-wheel drive fixed mode has been selected. This arrangement allows an abnormality (trouble) in the clutch 12 to be detected before the four-wheel drive enabled mode is selected again. Therefore, in a case where the two-wheel drive fixed mode is used in the summer and the four-wheel drive enabled mode is used in the winter, trouble with the clutch 12 can be detected and repaired in advance instead of being discovered for the first time in the winter when the driver attempts to use the four-wheel drive enabled mode. Furthermore, wear of the brushes and other consumable parts of the electric motor 4, as well as wear of the clutch itself, can be prevented effectively because the clutch diagnosis is executed only once, i.e., the first time the vehicle body speed Vcar becomes equal to or less than a prescribed speed (Vcar=0 in this embodiment), after the ignition switch 33 is turned ON and is not executed again until the next time the ignition switch 33 is turned ON and the same conditions are satisfied.

The present invention is not limited to the embodiments described heretofore and many variations and modifications are possible. For example, each of the embodiments used the left and right front wheels 1L and 1R as the main drive wheels and the left and right rear wheels 3L and 3R as the subordinate drive wheels, but it is also possible to treat the left and right front wheels 1L and 1R as the subordinate drive wheels and arrange them to be driven selectively by an electric motor 4 through a clutch 12 while treating the left and right rear wheels 3L and 3R as the main drive wheels and arranging them to be driven by an internal combustion engine 2. Also, the present invention is not limited to vehicles provided with a four-wheel drive enabled mode; instead it can be used in a wide range of vehicles having a wheel that is driven selectively by an electric motor through a clutch. Although the previously described embodiments illuminated or flashed a warning lamp 42 when the diagnosis result found the clutch 12 to be abnormal (have trouble), it is also possible to arrange for a warning sound to be emitted in conjunction with or instead of illuminating or flashing a warning lamp. Finally, the present invention is not limited to applications involving an electric clutch and can be applied effectively to situations in which a hydraulic clutch or other clutch is used.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-257550. The entire disclosure of Japanese Patent Application No. 2002-257550 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle drive control apparatus of a vehicle having a clutch disposed between an electric motor and a wheel driven by the electric motor, the drive control apparatus comprising:
    a clutch control section configured to control engagement of the clutch to selectively drive the wheel by the electric motor; and
    a diagnosis section configured to diagnose whether or not the clutch can be operated by controlling the clutch control section to turn on and off the clutch, when the diagnosis section determines that the wheel is not being driven by the electric motor.

2. The vehicle drive control apparatus as recited in claim 1, wherein
    the diagnoses section includes a vehicle speed detecting section configured to detect a speed of the vehicle, and the diagnosis section is further configured to diagnose only when the vehicle speed detected by the vehicle speed detecting section is equal to or less than a prescribed speed at or below which the electric motor will not enter an overspeed condition.

3. The vehicle drive control apparatus as recited in claim 2, wherein
    the diagnosis section is further configured to diagnose only when the prescribed speed is equal to or less than a vehicle speed at which a shock to the vehicle from turning on the clutch is below an allowable limit.

4. The vehicle drive control apparatus as recited in claim 2, wherein
    the diagnosis section is further configured to diagnose only when the vehicle speed detected by the vehicle speed detecting section is zero.

5. The vehicle drive control apparatus as recited in claim 2, wherein
    the diagnosis section is further includes a current sensor to determine if a current to the clutch is within a tolerance range when the clutch is turned on by the clutch control section.

6. The vehicle drive control apparatus as recited in claim 5, further comprising
    a warning section configured to issue a signal upon the diagnosis section determining the current being outside the tolerance range when the clutch is turned on by the clutch control section.

7. The vehicle drive control apparatus as recited in claim 5, wherein
    the diagnosis section is further configured to determine if the current to the clutch goes to zero when the clutch is turned off by the clutch control section.

8. The vehicle drive control apparatus as recited in claim 7, further comprising
    a warning section configured to issue a signal upon the diagnosis section determining at least one of the current being outside the tolerance range when the clutch is turned on by the clutch control section and if the current does not go to zero when the clutch is turned off by the clutch control section.

9. The vehicle drive control apparatus as recited in claim 1, wherein
    the diagnosis section is further configured to diagnose only once whether or not the clutch can be operated, each time a system switch is turned on.

10. The vehicle drive control apparatus as recited in claim 9, wherein
    the system switch is an ignition switch of the drive source.

11. The vehicle drive control apparatus as recited in claim 1, further comprising
    a mode selection section configured to select either of a multi-wheel mode in which the wheel is driven by the electric motor and another wheel is driven by a main drive source, and a non-all wheel mode in which the clutch is disengaged; and
    the diagnosis section is further configured to diagnose when the non-all wheel drive mode is selected by the mode selection section.

12. The vehicle drive control apparatus as recited in claim 11, wherein
    the diagnosis section is further configured to diagnose only once whether or not the clutch can be operated, each time a system switch is turned on.

13. The vehicle drive control apparatus as recited in claim 12, wherein
    the system switch is an ignition switch of the drive source is turned on.

14. The vehicle drive control apparatus as recited in claim 1, further comprising
    a main drive source arranged to drive at least one drive wheel that is not connected to the electric motor.

15. The vehicle drive control apparatus as recited in claim 14, wherein
    the main drive source is an internal combustion engine that drives a generator that supplies electricity to the electric motor.

16. A vehicle drive control apparatus of a vehicle having a clutch disposed between an electric motor and a wheel driven by the electric motor, the drive control apparatus comprising:
    clutch control means for controlling engagement of the clutch to selectively drive the wheel by the electric motor; and
    a diagnosis means for diagnosing whether or not the clutch can be operated by controlling the clutch control means to turn on and off the clutch, when the diagnosis means determines that the wheel is not being driven by the electric motor.

17. A method of controlling a vehicle having a clutch disposed between an electric motor and a wheel driven by the electric motor, the method comprising:
    controlling engagement of the clutch to selectively drive the wheel by the electric motor; and
    diagnosing whether or not the clutch can be operated by turning on and off the clutch, upon determining that the wheel is not being driven by the electric motor.

* * * * *